United States Patent [19]

Matschinsky

[11] Patent Number: 4,556,238
[45] Date of Patent: Dec. 3, 1985

[54] INDEPENDENT WHEEL SUSPENSION FOR MOTOR VEHICLES

[75] Inventor: Wolfgang Matschinsky, Munich, Fed. Rep. of Germany

[73] Assignee: Bayerische Motoren Werke Aktiengesellschaft, Munich, Fed. Rep. of Germany

[21] Appl. No.: 645,422

[22] Filed: Aug. 29, 1984

[30] Foreign Application Priority Data

Aug. 30, 1983 [DE] Fed. Rep. of Germany ....... 3331247

[51] Int. Cl.$^4$ .............................................. B60G 3/20
[52] U.S. Cl. ..................................... 280/701; 280/660; 280/670; 280/673; 280/725
[58] Field of Search ................ 280/93, 96.1, 660, 666, 280/667, 668, 670, 673, 675, 688, 690, 693, 695, 696, 698, 700, 701, 724, 725

[56] References Cited

U.S. PATENT DOCUMENTS

| | | | |
|---|---|---|---|
| 3,075,787 | 1/1963 | Mineck | 280/667 |
| 3,151,877 | 10/1964 | Bajer | 280/673 |
| 3,229,783 | 1/1966 | Müller | 280/690 |
| 3,871,467 | 3/1975 | Senft et al. | 280/701 |
| 4,245,853 | 1/1981 | Inoue et al. | 280/701 |

Primary Examiner—Joseph F. Peters, Jr.
Assistant Examiner—Kenneth R. Rice
Attorney, Agent, or Firm—Craig & Burns

[57] ABSTRACT

A three-guide member wheel suspension in which the wheel carrier is connected with the vehicle body or the like by way of three guide members pivotally connected at the vehicle body. The three guide members consist of a longitudinal guide arm, an upper cross guide member and a lower cross guide member. In order to be able to realize an effective center of rotation for the wheel carrier which lies clearly above the wheel axle in order to obtain with a rear axle a good accelerating pitching compensation and a good deceleration pitching compensation, the longitudinal arm is pivotally connected with the wheel carrier. Additionally, the upper cross guide member is pivotally connected intermediate its joint on the wheel carrier side and its joint on the body side with one end of a support strut which pivotally engages with its other end at the longitudinal arm between the pivot axis at the wheel carrier and the forward bearing support of the wheel carrier.

22 Claims, 16 Drawing Figures

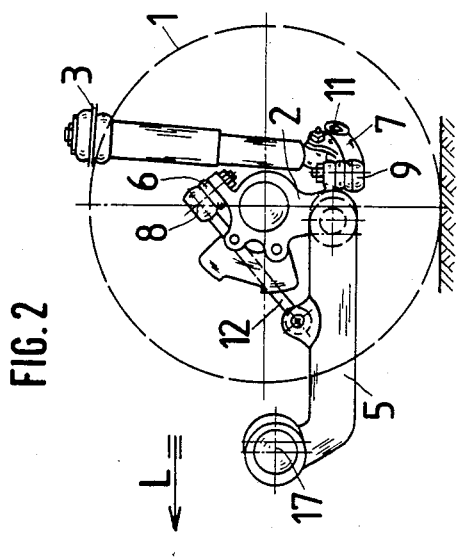
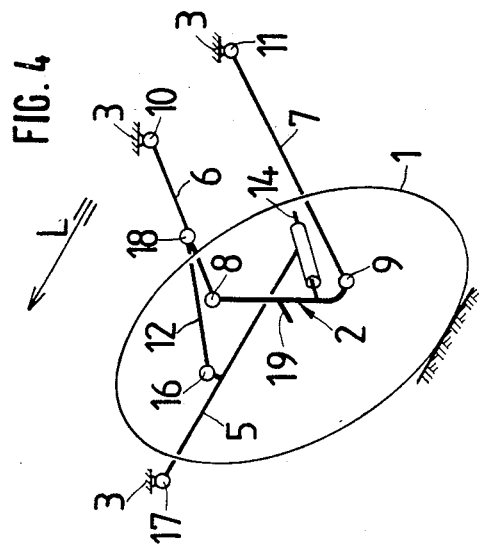
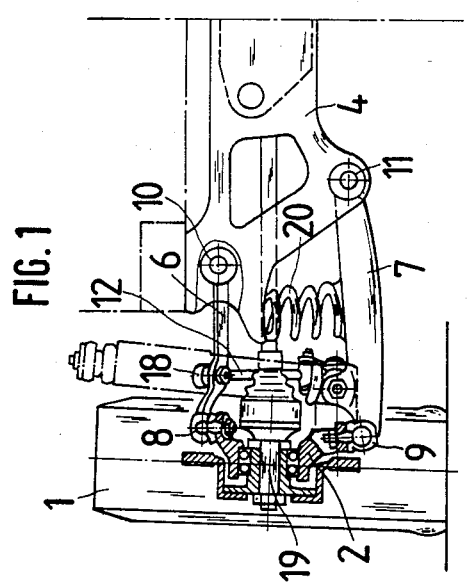
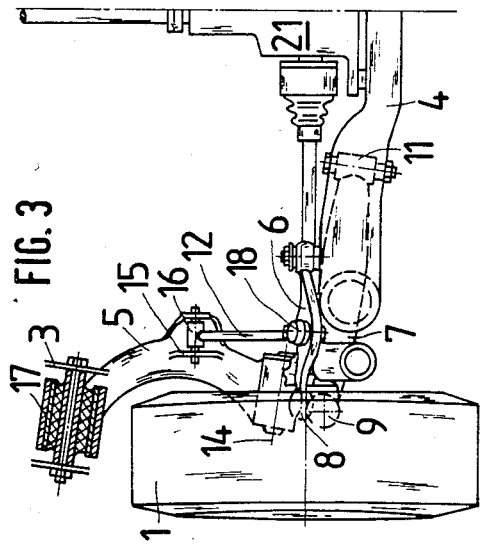

INDEPENDENT WHEEL SUSPENSION FOR MOTOR VEHICLES

The present invention relates to an independent wheel suspension for motor vehicles, especially for the driven rear wheels of passenger motor vehicles, with a wheel carrier supporting thereon the wheel, which is connected with the vehicle body or the like by way of three guide members pivotally connected at the body or the like, of which one guide member is a longitudinal arm extending essentially in the vehicle longitudinal direction and the other two guide members which engage at the wheel carrier by way of joints, are cross guide members arranged essentially one above the other and extending at least approximately in the vehicle transverse direction.

Such vehicle suspensions are known (compare, for example, French Patent No. 1,425,504) and have also been built in practice (compare ATZ, 1963, pages 362 and 363). Axles with wheel suspensions of this type, which are frequently referred to as 3-guide member axles offer, for example, with the use as rear axles, the advantage that the structural space between the longitudinal arm and the two cross guide members can be kept far-reachingly free and that more space is available for the accommodation of the fuel tank, of the rear seat and the like than with other types of constructions, in which points of pivotal connection for the guide members are located within this area. By reason of the only three points of pivotal connection per wheel at the vehicle body, axles of this type additionally offer the advantage of a relatively simple construction and easy assembly.

The known wheel suspensions of the aforementioned type of construction, however, still entail the significant disadvantage that an acceleration pitch compensation is possible with a rear axle only if the point of pivotal connection of the longitudinal arm on the side of the vehicle body, which is located in front of the wheel as viewed in the driving direction, is arranged higher than the wheel center. This, in turn, requires the renunciation of the otherwise possible advantages as regards the installation possibilities of the rear seat, possibly also of the fuel tank, especially with four-seat passenger motor vehicles. Furthermore, it is difficult with the prior art 3-guide member axles to avoid a steering angle of the wheel in the direction of toe-out during the inward (compressing) and outward (rebounding) spring movements because the cross guide members move the wheel carrier toward the vehicle center during such inward and outward spring movements. A satisfactory solution would be obtainable in that case only if the cross guide members are constructed as long as possible and are nonetheless inclined toward one another to such an extent that a considerable camber change occurs during the inward and outward spring movements. The long cross guide members, in turn, would create considerable space problems and the strong wheel camber change would considerably increase the tire wear.

The present invention is concerned with the task to provide an independent wheel suspension of the aforementioned type which is relatively simple in construction and assembly while avoiding the aforementioned disadvantages, respectively, compromises, but which nonetheless enables an effective acceleration pitching compensation without having to arrange the bearing support of the longitdunal arm higher than the wheel center.

The underlying problems are solved according to the present invention in a wheel suspension of the aforementioned type in that the wheel carrier is pivotally arranged at the longitudinal arm and in that one of the cross guide members is pivotally connected intermediate its joint on the wheel carrier side and its joint on the body side with one end of a support strut which pivotally engages with its other end at the longitudinal arm. It is possible in this manner, as will be described more fully hereinafter by reference to several embodiments, to impart or force upon the point of engagement of the cross guide member connected with the support strut, a movement path and a velocity during the inward and outward spring movements which in conjunction with the movement path and the velocity of the engagement point of the longitudinal arm at the wheel carrier, permits the wheel carrier, as viewed in side view, to pivot about an ideal center of rotation that lies considerably higher than the real point of pivotal connection of the longitudinal arm at the vehicle body or the like. By reason of the fact that the longitudinal arm is pivotal relative to the wheel carrier, it is possible, for example, by inclining this pivot axis (as viewed in plan view) with respect to the vehicle transverse direction, to impart to the compressing and rebounding wheel (undergoing inward and outward spring movement) also a slight steering component in the direction of toe-in which compensates, respectively, overcompensates the slight steering movement in toe-out conditioned on the type of construction.

In the preferred embodiments illustrated in the drawing, the upper cross guide member is connected in each case with the support strut whereby this support strut, on the other hand, is connected with a longitudinal arm engaging in the lower area of the wheel carrier, which longitudinal arm is directed forwardly from the wheel carrier, as viewed in the driving direction.

These and other objects, features and advantages of the present invention will become more apparent from the following description when taken in connection with the accompanying drawing which shows, for purposes of illustration only, several embodiments in accordance with the present invention, and wherein:

FIG. 1 is a rear view of a first embodiment of a wheel suspension in accordance with the present invention;

FIG. 2 is a side view of the wheel suspension of FIG. 1;

FIG. 3 is a plan view on the wheel suspension according to FIG. 2;

FIG. 4 is a perspective illustration in principle of the suspension according to FIGS. 1 to 3;

Figure 5:
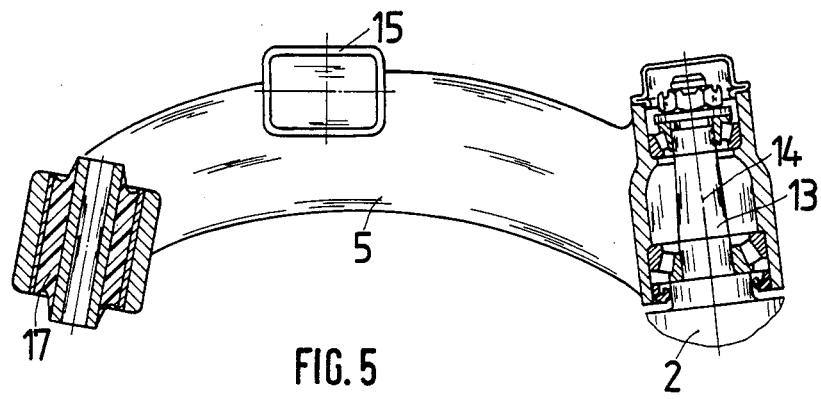
FIG. 5 is a plan view on the longitudinal arm of the wheel suspension in accordance with the present invention, partly in cross section.

Referring now to the drawing wherein like reference numerals are used throughout the various views to designate like parts, the independent wheel suspension shown in FIGS. 1 to 4 serves for the left rear driven wheel 1 of a motor vehicle. It is supported on a wheel carrier 2 which is connected with the vehicle body 3 only schematically indicated in the drawing, respectively, with an auxiliary bearer 4 to be threadably connected to the vehicle body 3, by way of three guide members. The three guide members are pivotally connected on the body side by way of joints, preferably rubber joints, permitting cardanic or universal movements. The three guide members consist of a longitudinal arm 5 which extends essentially in the vehicle longitudinal direction L as well as of an upper cross guide member 6 and of a lower cross guide member 7. The upper cross guide member 6 engages at the wheel carrier 2 in the upper area thereof by way of a ball joint 8 and the lower cross guide member 7 engages at the wheel carrier 2 in the lower area thereof by way of a ball joint 9. The upper cross guide member 6 is pivotally connected at the already mentioned auxiliary bearer 4 by means of a rubber joint 10 and the lower cross guide member 7 by way of a rubber joint 11. The two cross guide members 6 and 7, which extend essentially in the vehicle transverse direction, could also be pivotally connected directly at the vehicle body 3 (without auxiliary bearer 4).

The wheel carrier 2 is pivotally arranged at the longitudinal arm 5 which is known as such (for example from racing cars or also from the German Offenlegungsschrift No. 20 38 880). The upper cross guide member 6 is pivotally connected intermediate its joint 8 on the wheel carrier side and its joint 10 on the body side, with one end of a support strut 12 which pivotally engages with its other end at the longitudinal arm 5. The longitudinal arm 5 is pivotally connected at the wheel carrier 2 within the lower area thereof and extends forwardly from the wheel carrier 2 in the driving direction.

One possibility of how the longitudinal arm 5 can be supported at the wheel carrier 2 so as to be corner-rigid but pivotal, is illustrated in FIG. 5. An inwardly directed bearing pin 13 of the wheel carrier 2 serves as bearing seat for two conical roller bearings which, on the other hand, support the longitudinal arm 5. At a distance from the bearing axis 14, the longitudinal arm carries a bearing lug or bracket 15 for the accommodation of the joint 16, by way of which the support strut 12 is operatively connected with the longitudinal arm 5. The forward end of the longitudinal arm 5 surrounds a rubber bearing 17 which, with its tubularly shaped inner part, is rigidly connected with the vehicle body 3 or the like.

In the embodiments according to FIGS. 1 to 4, the support strut 12 extends from the upper cross guide member 6 to the longitudinal arm 5 obliquely downwardly and forwardly. For this embodiment, the operation of the measures in accordance with the present invention will be explained more fully hereinafter by reference to FIG. 6.

Figure 6:
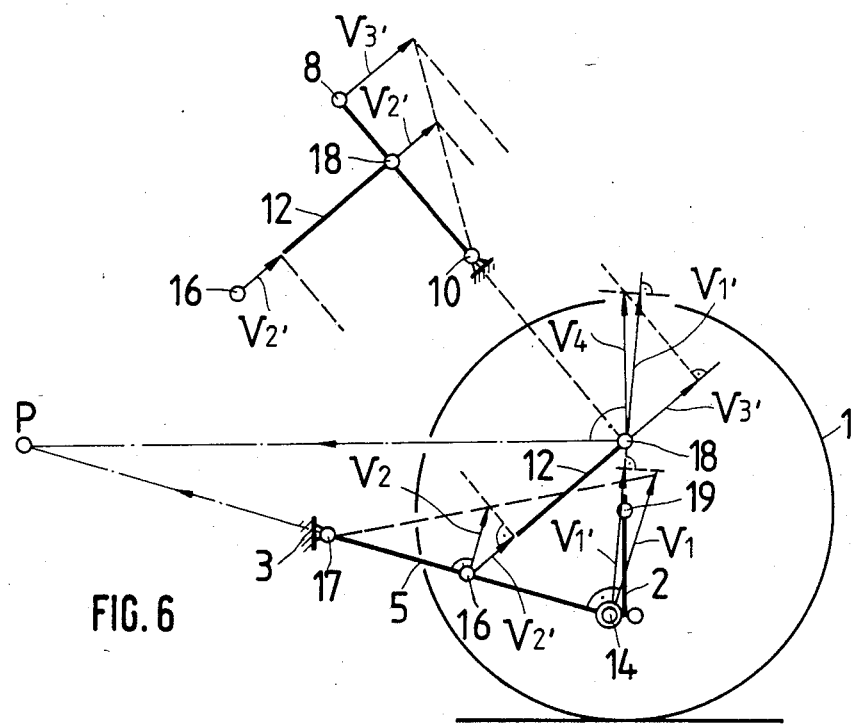
FIG. 6 is a diagram corresponding approximately to FIG. 2 and illustrating in principle the wheel suspension and including velocity vectors.

For purposes of simplification, it is assumed in FIG. 6 that the cross guide members extend exactly horizontally which, as such, however, would not be necessarily required.

The inward (compressing) spring movement velocity $v_1$ of the bearing on the wheel carrier side (which corresponds far-reachingly to the pivot axis 14) of the longitudinal arm 5 has as a consequence a velocity $v_2$ of the joint 16 of the inclined support strut 12 and the velocity $v_2$ has the component velocity $v_2'$ in the direction of the support strut 12 which is also the corresponding component of the velocity of the pivotal connecting point 18 of the support strut 12 at the upper cross guide member 6. This velocity component $v_2'$ is also illustrated in the schematic diagram illustrated in the upper left corner of FIG. 6 as movement component of the point of pivotal connection 18 in the direction of the support strut 12. By reason of the distance of the point of pivotal connection 18 from the joint 8 on the wheel carrier side of the upper cross guide member 6, a velocity component $v_3'$ occurs at the joint 8 on the wheel carrier side which is directed in the same direction but increased by the aforementioned distance ratio.

In the side view (illustrated in the bottom part of FIG. 6), on the other hand, the components of the velocity $v_1$ and of the velocity of the outer ball joint 8 of the upper cross guide member 6 must be equal in the direction of the connecting line of the two bearings, respectively, joints ($v_1' = v_1'$). The velocity $v_4$ of the upper ball joint 8 and the direction thereof results from the point of intersection of the perpendiculars on the velocity component $v_1'$ and $v_3'$. The center of rotation P of the wheel suspension lies, as viewed in side view, in the point of intersection of the perpendicular on the velocity component $v_4$ and of the extension of the longitudinal arm 5. As can be recognized from FIG. 6, the instantaneous center of rotation P lies considerably higher than the wheel center which is indicated in FIG. 6 by the wheel axle 19, even though the forward bearing support 17 of the longitudinal arm 5 lies lower than the wheel center. Consequently, with a wheel suspension according to the present invention, a very good acceleration pitching compensation and also a very good braking or deceleration pitching compensation (nose diving compensation) can be achieved with simultaneous favorable installation conditions of the wheel suspension. The kinematic construction and design of the cross guide members 6 and 7 can nonetheless be made free of limitations as regards camber-change and toe-in change solely according to desired criteria, for example, such as roll center height.

An elastic (slight) steering effect during the braking or the acceleration can be controlled in a known manner by the use of an elastic bearing 17 (on the vehicle frame side) of the longitudinal arm 5, which has different spring rates in different directions in that one chooses the spatial arrangement corresponding to these directions.

As can be recognized from the drawing, the lower cross guide member 7 can be pivotally connected at the wheel carrier 2 to the rear of the wheel center in order to produce an understeering, elastic steering behavior in case of lateral forces. The lower cross guide member 7 serves preferably for the mounting of the spring 20 in order to keep small the structural height of the wheel suspension. Both cross guide members 6 and 7 and also the spring 20 can be preassembled on the transversely extending auxiliary bearer 4 which also supports the rear axle gear 21 (FIG. 3) and in its turn is rigidly screwed together with the remaining vehicle body.

Figure 7:
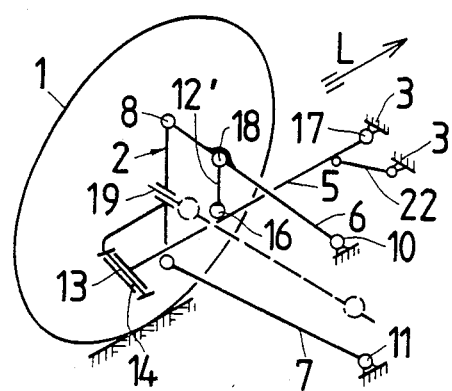
FIGS. 7 and 8 are schematic perspective views of two further embodiments of a wheel suspension in accordance with the present invention.

Small toe-in changes under the infleunce of braking or acceleration forces, but also under the influence of the inward or outward (compressing and rebounding) spring movement can also be achieved in the desired direction with corresponding elasticities of the forward bearing 17 of the longitudinal arm 5 by an additional guide member 22 illustrated in FIG. 7 which, on the one hand, pivotally engages at the longitudinal arm 5 and, on the other, at the vehicle body 3 and extends at least approximately transversely to the vehicle longitudinal direction.

With an elastic longitudinal movement of the wheel suspension (caused by longitudinal shocks or impacts), the upper point of pivotal connection 18 at the wheel carrier 2 carries out in the embodiment according to FIGS. 1 to 6 a larger horizontal path or travel than the bearing 14 of the longitudinal arm 5 at the wheel carrier 2 by reason of the "transmission ratio" of the path of the support strut 12 (compare FIG. 6: ratio $v_2':v_3'$). For that reason, with such elastic longitudinal movements of the wheel suspension a center of rotation results for the wheel carrier 2 which is located below the tire contact area of the wheel 1 at a finite distance. The rolling-off of the wheel 1 then produces a smaller relative number of rotation by reason of the simultaneous pivot movement of the wheel carrier 2 about the aforementioned center of rotation which reduces the influence of the measuring accuracy of an ABS sensor in a favorable manner.

In the embodiments according to FIGS. 7 to 14, the support strut 12' extends approximately vertically. It is avoided in this manner that horizontal force components—especially longitudinal force components are transmitted onto the upper cross guide member 6 by way of the support strut. The construction and layout of the elastic kinematics of the wheel suspension are simplified thereby. The forward bearing 17 of the longitudinal arm 5, respectively, 5' then transmits essentially alone the longitudinal forces and can then be designed and constructed particularly favorably as regards toe-in changes and the like in the manner already indicated hereinabove.

Figure 8:
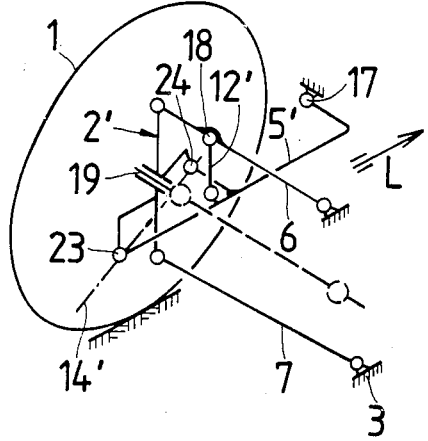
Figure 9:
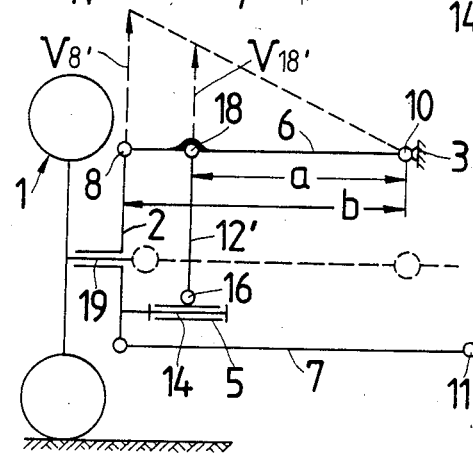
FIG. 9 is an end elevational view of the embodiment according to FIG. 7.

As can be seen from FIGS. 7 and 8, the pivot axis 14, respectively, 14' about which the wheel carrier 2, respectively, 2' is pivotal with respect to the longitudinal arm 5, respectively, 5' is inclined to the wheel axle 19. The pivot axis 14, 14' thereby preferably extends in plan view from the rear inside outwardly and forwardly in the driving direction. As a result thereof, a very favorable toe-in curve can be achieved over the inward and outward spring travel. In the illustration according to FIG. 7, as also in the embodiments according to FIGS. 1–4, the pivot axis 14 is thereby formed by a pure rotary joint, for example, by means of a bearing pin 13 that carries two roller bearings (see also FIG. 5).

According to FIG. 8, the pivot axis 14' can also be formed by two ball joints 23 and 24 arranged at a distance from one another which define a pivot axis 14', about which the wheel carrier 2' is pivotal with respect to the longitudinal arm 5'. By reference to the illustration according to FIG. 7, it should be explained with the aid of FIGS. 9 and 10, how the principle on which the present invention is based can be realized also with the vertical support strut 12', in connection with which, with a relatively low forward bearing point 17 of the longitudinal arm 5, nonetheless a high pivot center of the wheel suspension is attained, as viewed in side view, which assures a good acceleration pitching compensation and deceleration pitching compensation.

Figure 10:
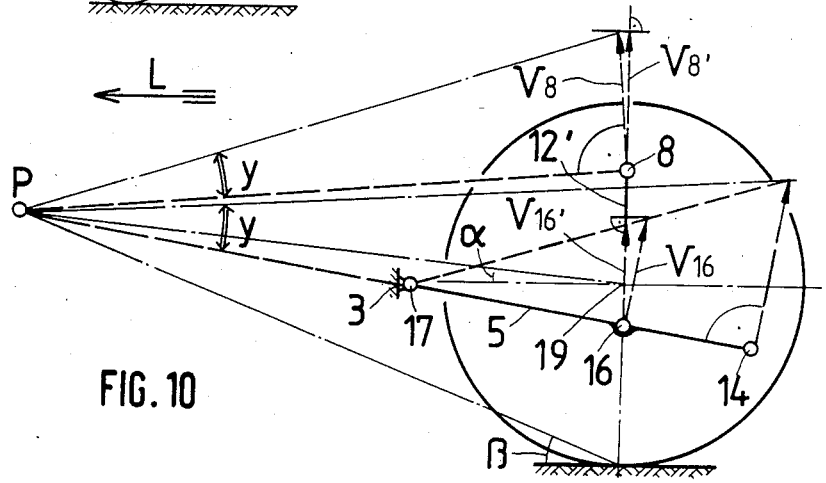
FIG. 10 is a diagram corresponding to FIG. 6 for the embodiment according to FIG. 7.

The joint 16, by way of which the support strut 12' engages at the longitudinal arm 5, is assumed to move during an inward (compressing) spring movement with the velocity $v_{16}$. The vertical component in the direction of the vertical strut 12' is $v_{16}'$ (FIG. 10). The upper point of pivotal connection 18 of the vertical strut 12' has the vertical velocity $v_{18}'$ ($=v_{16}'$) which produces for the upper outer joint point 8 of the upper cross guide member 6 according to FIG. 9 the vertical velocity component $v_8'$.

With a desired center of rotation P about which the wheel carrier 2 is to rotate, the upper point of pivotal connection 8 has the velocity $v_8$. This velocity also has a vertical velocity component $v_8'$ in the direction of the vertical support strut 12'. By properly matching the lever arm ratio a/b, the velocity $v_8'$ determined according to FIG. 10, is equated to the corresponding velocity $v_8'$ in FIG. 9. The center P can be chosen in this manner also clearly above the wheel axle 19 even though the (real) bearing 17 of the longitudinal arm 5 does not lie above the wheel axle 19.

For the installation of the rear seat, also of a fuel tank which is located in front of the wheel axle, the already described advantages will again result. The braking support or bracing angle is designated in FIG. 10 by $\beta$ whereas the acceleration support or bracing angle is designated in this Figure by $\alpha$.

Figure 11:
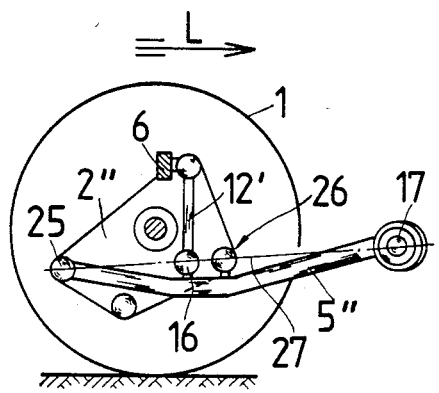
FIG. 11 is a side elevational view of a further embodiment of a wheel suspension in accordance with the present invention.
Figure 12:
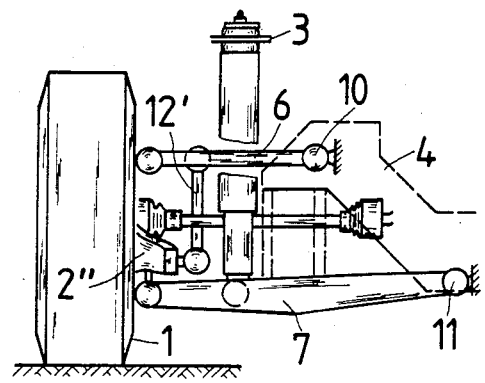
FIG. 12 is an end elevational view of the wheel suspension of FIG. 11.
Figure 13:
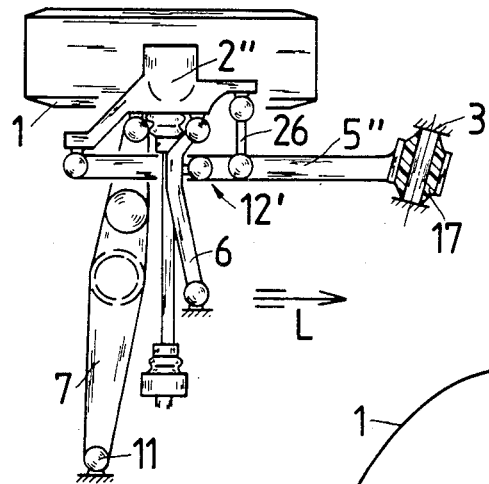
FIG. 13 is a top plan view on the wheel suspension of FIGS. 11 and 12.
Figure 14:
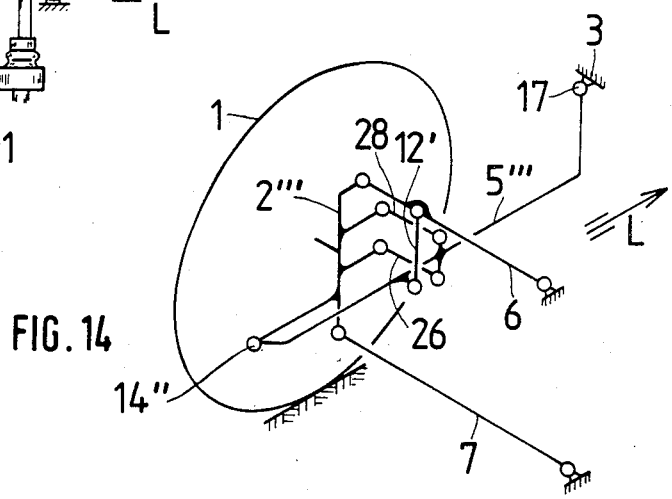
FIGS. 14, 15 and 16 are schematic illustrations indicating in principle three further embodiments of a wheel suspension in accordance with the present invention.
Figure 15:
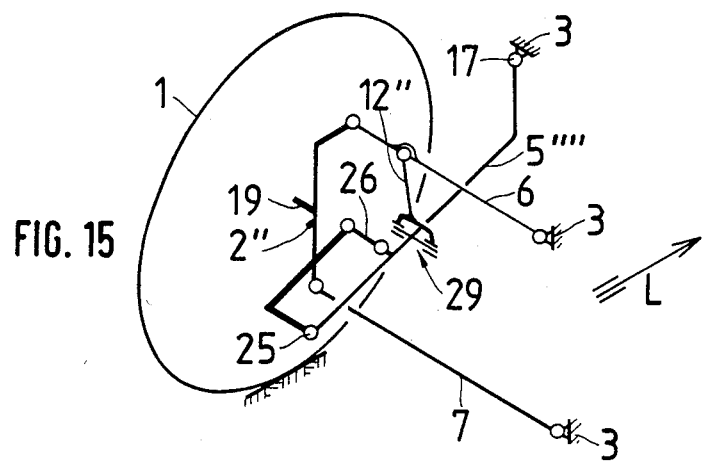

Also in the embodiment according to FIGS. 11–13, only three points of pivotal connection are present on the side of the body with simultaneous good space availability between these points of pivotal connection (FIG. 13). The pivot axis between the wheel carrier 2" and the longitudinal arm 5" is thereby formed by a ball-like pivotal connection 25 (of the pivot arm at the wheel carrier) and by a cross strut 26 pivotally engaging at each of the wheel carrier 2" and longitduinal arm 5" The cross strut 26 thereby prevents that, for example, with the spatial arrangement of the pivot axis as is illustrated by the pivot axis 14' in FIG. 8, a rotary movement of the longitudinal arm 5" takes place about its longitudinal axis. The jointed connections at both ends of the cross strut 26 are formed appropriately by ball joints. In order that all of the pivotal or jointed connections can move kinematically correctly in the embodiment of the novel wheel suspension illustrated in FIGS. 11 to 13 the points of pivotal connections in the connections longitudinal arm 5"/wheel carrier 2" (point of pivotal connection 25), longitudinal arm 5"/support strut 12' (joint 16), longitudinal arm 5"/cross strut 26 (the inner joint thereof) and longitudinal arm 5"/vehicle body 3 (bearing 17) lie on a straight line 27 (FIG. 11). The above requirement, according to which the described joints must be located on the straight line 27, can be dispensed with if, according to FIG. 14, a further cross strut 28 is provided at a vertical distance to the first cross strut 26, which second cross strut 28 also pivotally engages at the wheel carrier 2''' and at the longitudinal arm 5'''. This admittedly means a greater structural expenditure; however, it provides again greater freedoms for the constructive design of the longitudinal arm 5''' so that, for example, the forward bearing 17 can be placed again more or completely in front of the wheel center, which is advantageous for a favorable absorption of longitudinal forces. In lieu of the just-described further cross strut 28 of the embodiment according to FIG. 14, also a support strut 12" may be provided with a favorable force introduction into the forward bearing 17 of the longitudinal arm 5'''', which support strut 12'' is connected with the longitudinal arm 5'''' by a corner-rigid rotary joint 29, whose axis of rotation extends essentially in the vehicle transverse direction (FIG. 15).

Figure 16:
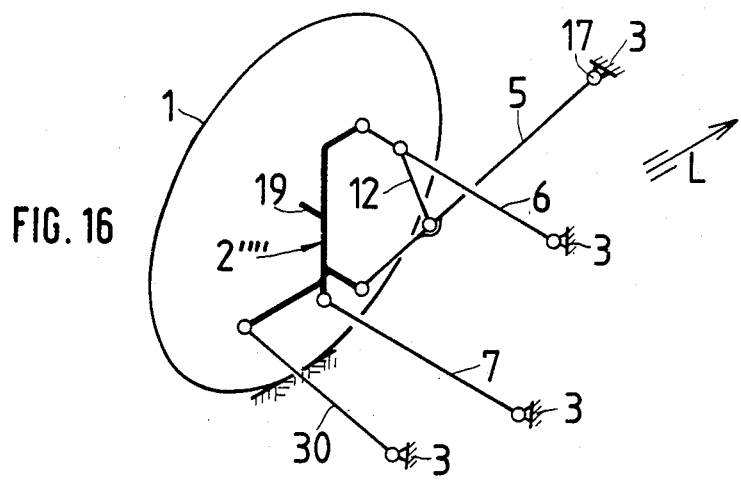

Finally, the aforementioned cross strut 26 may also be dispensed with if, as can be seen from FIG. 16, a tie rod or track rod 30 pivotally engages at the wheel carrier 2'''', which is pivotally connected with the other end thereof at the vehicle body 3. This admittedly leads to one further point of pivotal connection at the vehicle body or at a cross bearer to be connected therewith; however, the principle according to the present invention and the advantages achieved therewith are realizable also by the support strut 12 already described by reference to FIGS. 1 to 4 also with the advantages achieved therewith.

While I have shown and described several embodiments in accordance with the present invention, it is understood that the same is not limited thereto but is susceptible of numerous changes and modifciations as known to those skilled in the art, and I therefore do not wish to be limited to the details shown and described herein but intend to cover all such changes and modifications as known to those skilled in the art.

I claim:

1. An independent wheel suspension for motor vehicles, comprising wheel carrier means supporting a vehicle wheel, a relatively fixed vehicle part, means connecting the wheel carrier means with said fixed vehicle part including three guide means pivotally connected at said fixed vehicle part, one of said guide means being a longitudinal arm extending generally in the vehicle longitudinal direction and the other two guide means being cross guide members disposed one above the other and extending at least approximately in the vehicle transverse direction which are pivotally connected at the relatively fixed part and at the wheel carrier means by joint means, the wheel carrier means being pivotally arranged at said longitudinal arm, and support strut means, one of said cross guide members being pivotally connected intermediate its joint means on the wheel carrier side and its joint means on the side of the relatively fixed part with one end of the support strut means while the support strut means pivotally engages with its other end at the longitudinal arm.

2. An independent wheel suspension according to claim 1, wherein the wheel suspension is for driven rear wheels of a passenger motor vehicle.

3. An independent wheel suspension according to claim 1, wherein said fixed vehicle part is the vehicle body or a part connected therewith.

4. A wheel suspension according to claim 1, wherein the upper cross guide member is connected with the support strut means.

5. A wheel suspension according to claim 4, wherein the longitudinal arm is pivotally connected at the wheel carrier means within the lower area thereof.

6. A wheel suspension according to claim 1, wherein the longitudinal arm is directed forwardly from the wheel carrier means, as viewed in the driving direction.

7. A wheel suspension according to claim 6, wherein the upper cross guide member is connected with the support strut means.

8. A wheel suspension according to claim 7, wherein the support strut means extends from the upper cross guide member to the longitudinal arm obliquely forwardly and downwardly.

9. An independent wheel suspension according to claim 1, wherein said longitudinal arm is connected with the relatively fixed part by way of a transversely elastic bearing means, further comprising an approximately transversely directed auxiliary guide member which engages at said longitudinal arm, said auxiliary guide member being pivotally connected, on the other hand, with said relatively fixed vehicle part.

10. A wheel suspension according to claim 1, wherein the support strut means extends approximately vertically.

11. A wheel suspension according to claim 1, wherein the pivot axis, about which the wheel carrier means is pivotal about the longitudinal arm, is inclined to the wheel axis.

12. A wheel suspension according to claim 1, wherein the pivot axis about which the wheel carrier means is pivotal about the longitudinal arm, extends—as viewed in plan view—from the rear forwardly and outwardly in driving direction.

13. A wheel suspension according to claim 1, wherein the pivot axis, about which the wheel carrier means is pivotal about the longitudinal arm, is formed by a pure rotary joint.

14. A wheel suspension according to claim 13, wherein said rotary joint includes a bearing pin.

15. A wheel suspension according to claim 11, wherein the pivot axis about which the wheel carrier means is pivotal about the longitudinal arm, extends—as viewed in plan view—from the rear forwardly and outwardly in driving direction.

16. A wheel suspension according to claim 15, wherein the pivot axis, about which the wheel carrier means is pivotal about the longitudinal arm, is formed by a pure rotary joint.

17. A wheel suspension according to claim 1, wherein said wheel carrier means is pivotal with respect to the longitudinal arm by way of two ball joints arranged at a distance from one another.

18. A wheel suspension according to claim 1, wherein the pivot axis between wheel carrier means and longitudinal arm is formed by a ball-like pivotal connection of the longitudinal arm at the wheel carrier means and a cross strut means pivotally engaging at the wheel carrier means and the longitudinal arm.

19. A wheel suspension according to claim 18, wherein the point of pivotal connection of the connections longitudinal arm/wheel carrier means, longitudinal arm/support strut means, longitudinal arm/cross strut means and longitudinal arm/relatively fixed vehicle part lie on a straight line.

20. A wheel suspension according to claim 18, wherein a second cross strut means also pivotally engaging at the wheel carrier means and at the longitudinal arm is provided at a vertical distance to the first cross strut means.

21. A wheel suspension according to claim 20, wherein the support strut means is connected with the longitudinal arm by a corner-rigid pivot joint whose axis of rotation extends essentially in the vehicle transverse direction.

22. A wheel suspension according to claim 1, further comprising a tie rod which is pivotally connected, on the one hand, with the wheel carrier means and, on the other, with the relatively fixed vehicle part.

* * * * *